(12) United States Patent
Chabrol et al.

(10) Patent No.: US 10,351,691 B2
(45) Date of Patent: Jul. 16, 2019

(54) HALOGEN CONTAINING POLYMER COMPOSITION WITH TIN STABILIZER AND CO-STABILIZER

(75) Inventors: Anne Chabrol, Lyons (FR); Isabelle Tartarin, Lyons (FR); Berth Jan Deelman, Kapelle (NL)

(73) Assignee: PMC ORGANOMETALLIX, INC., Mount Laurel, NJ (US)

( * ) Notice: Subject to any disclaimer, the term of this patent is extended or adjusted under 35 U.S.C. 154(b) by 1357 days.

(21) Appl. No.: 14/111,196

(22) PCT Filed: Apr. 13, 2012

(86) PCT No.: PCT/EP2012/056792
§ 371 (c)(1),
(2), (4) Date: Jul. 14, 2014

(87) PCT Pub. No.: WO2012/140204
PCT Pub. Date: Oct. 18, 2012

(65) Prior Publication Data
US 2014/0322469 A1    Oct. 30, 2014

(30) Foreign Application Priority Data

Apr. 13, 2011 (FR) ..................... 11 01137

(51) Int. Cl.
| | |
|---|---|
| *C08K 5/06* | (2006.01) |
| *C08K 5/00* | (2006.01) |
| *C08K 5/05* | (2006.01) |
| *C08K 5/101* | (2006.01) |
| *C08K 5/103* | (2006.01) |
| *C08K 5/12* | (2006.01) |
| *C08K 5/58* | (2006.01) |
| *C08L 27/06* | (2006.01) |
| *C08L 29/04* | (2006.01) |
| *C08L 55/02* | (2006.01) |
| *C08K 5/053* | (2006.01) |

(52) U.S. Cl.
CPC ............. *C08K 5/06* (2013.01); *C08K 5/005* (2013.01); *C08K 5/053* (2013.01); *C08K 5/101* (2013.01); *C08K 5/103* (2013.01); *C08K 5/12* (2013.01); *C08K 5/58* (2013.01); *C08L 27/06* (2013.01); *C08L 29/04* (2013.01); *C08L 55/02* (2013.01); *C08L 2205/03* (2013.01); *Y10T 428/139* (2015.01)

(58) Field of Classification Search
CPC .......... C08K 5/06; C08K 5/005; C08K 5/053; C08K 5/101; C08K 5/103; C08K 5/12; C08K 5/58; C08L 27/06; C08L 29/04; C08L 55/02; C08L 2205/03; Y10T 428/139
USPC ....................................... 428/36.9
See application file for complete search history.

(56) References Cited

U.S. PATENT DOCUMENTS 5,120,783 A * 6/1992 Nosu ................. C08K 3/22
524/147

FOREIGN PATENT DOCUMENTS

WO    WO2009/138474    11/2009
WO    WO 2009138474 A1 * 11/2009 ............ C07F 7/2232

OTHER PUBLICATIONS

International Search Report; dated Jul. 25, 2012; International Application No. PCT/EP2012/056792; International Filing Date: Apr. 13, 2012; 3 pages.

* cited by examiner

*Primary Examiner* — Ronald Grinsted
(74) *Attorney, Agent, or Firm* — Garvey, Smith & Nehrbass, Patent Attorneys, L.L.C.; Mackenzie D. Rodriguez; Seth M. Nehrbass

(57) ABSTRACT

The present invention relates to the thermal stabilization of halogen containing polymer compositions. More particularly the invention relates to a tin stabilizer composition for chlorine containing polymers, and more specifically a composition comprising a mono alkyltin compound as major compound of the tin stabilizer composition and a co-stabilizer.

The present invention relates as well to the use of a mono alkyl tin compound as major compound of the tin stabilizer and a co-stabilizer as heat stabilizers for processing chlorine containing polymer composition.

20 Claims, No Drawings

HALOGEN CONTAINING POLYMER COMPOSITION WITH TIN STABILIZER AND CO-STABILIZER

FIELD OF THE INVENTION

The present invention relates to the thermal stabilization of halogen containing polymer compositions. More particularly the invention relates to a tin stabilizer composition for chlorine containing polymers, and more specifically a composition comprising a mono alkyltin compound as major compound of the tin stabilizer composition and a co-stabilizer.

The present invention relates as well to the use of a mono alkyl tin compound as major compound of the tin stabilizer and a co-stabilizer as heat stabilizers for processing chlorine containing polymer composition.

TECHNICAL PROBLEM

It is well known that halogen containing polymers and chlorine polymers in particular have a low thermal stability. For example especially the widely used polyvinylchloride (PVC) is an unstable polymer, sensitive to high temperature, shear and UV. Despite this fact, processing is possible by adding specific heat stabilizers that stop the damage.

At high temperatures, while processing PVC, degradation by dehydrochlorination, chain scission and crosslinking takes place. The free hydrogen chloride (HCl) evolves and discoloration of the resin occurs along with other changes in physical and chemical properties. The undesirable color changes (usually refereed to as yellowing) often occur within the first 5 to 15 minutes of the processing at elevated temperatures, but also during later stages of thermal processing.

The degradation is controlled by the addition of stabilizers, these heat stabilizers have to prevent especially the dehydrochlorination reaction, which is the primary process in degradation, thus obtaining the requirement for the thermoplastic processing of chlorine containing polymers or PVC at elevated temperature. The thermal degradation during the application of the halogen containing polymers is retarded is well.

Alkyltin derivatives are an important class of stabilizers, especially for chlorine containing polymers and more particularly PVC. These compounds react with HCl and block instable chlorine groups. Common alkyl tin derivatives are monoalkyl tin compounds and dialkyltin compounds; and both of them contain some minor traces of trialkyl tin compounds, due to the production methods used in practice. Mono alkyl and di alkyl tin compounds are often used as a mixture, because the combination of the two improves synergistically the initial colour as well as the long term heat stability of PVC.

However, tri-alkyltin compounds are known to be toxic compounds, and di-alkyltin compounds have recently been classified as toxic compounds. Toxicity of alkyltin compounds is known to be linked to the di- and tri-alkyl tin compound contents, particularly toxicity is increasing from mono-, to di- and to tri-alkyl tin compound contents. Therefore it is nowadays highly relevant to use mono-alkyltin compounds, with low levels of di- and tri-alkyl tin compounds, in order to avoid toxicity issues.

Mono-alkyltin compounds possess a good or even better performance in terms of colour change if used in moderate concentrations in a thermoplastic processable polymer composition as compared to mixtures of mono- and dialkyltin compounds. However when used in more important quantities the performance in terms of colour change of mono-alkyltin compounds is equal or worse compared to mixtures of mono- and dialkyltin compounds Mono-alkyltin compounds possess a good performance at the beginning of the thermal processing of halogen containing polymers and particularly chlorine containing polymers in terms of colour change. But in order to serve as a good heat stabilizer they should perform also acceptable up to 20 minutes or even to 22 minutes of thermal processing similar as mixtures of mono- and dialkyltin compounds, that are also used for the heat stabilization of chlorine containing polymers for processing.

One objective of the invention is therefore to solve the aforementioned technical problems associated with processing a halogen containing polymer in general and especially a chlorine containing polymer that is heat stabilized with a mono alkyl tin compound over longer periods of time during thermal processing.

Another objective of the invention is to provide a stabilized chlorine polymer composition heat stabilized by a mono alkyl tin compound and a co-stabilizer.

A further objective of the invention is to provide a co-stabilizer that fulfils the role of another additive, as for example chlorine containing polymers and especially PCV already are additivated by different kind of additives as impact modifiers, processing aids, lubricants, all kind of stabilizers.

Still another objective of the invention is to provide a chlorine polymer composition heat stabilized by a mono alkyl tin compound and a co-stabilizer that is at same time a lubricant.

BACKGROUND OF THE INVENTION

Prior Art

The document WO2009/138474 describes high purity mono alkyltin compounds and uses thereof as stabilizer for chlorine containing polymers. Co-stabilizers are mentioned in a very general way and specified only as being part of general classes of chemical compounds. As preferred classes two embodiments with either dihydropyridine compounds or metal soaps of carboxylic acids are mentioned as co-stabilizers.

The document WO2009/153227 describes polyvinylacohol (PVA) as co-stabilizer for PVC in combination with metal ions. The metal ions are in the form of organic or inorganic salts, and preferably salts of carboxylic acids. However the PVA has to have to a degree of polymerization of at least 100 to less than 700.

The document WO2009/010578 describes carboxy modified polyvinylacohol as co-stabilizer for PVC in combination with metal ions.

BRIEF DESCRIPTION OF THE INVENTION

Surprisingly it was discovered that the choice of certain compounds as co-stabilizers increases significantly the performance of mono alkyltin compounds, especially the long term heat stability during transformation and processing.

Surprisingly it has also been discovered that these compounds can serve as lubricants as well.

Moreover, these co-stabilizer compounds are found to be efficient in combination with mono alkyl tin compounds while in combination with high ratio of dialkyl tin compound in a mixture, they do not bring a significant improvement.

Unexpectedly, it has been found that a thermoplastic processable stabilized polymer composition comprising
a) at least one halogen containing polymer
b) a tin based stabilizer composition comprising a monoalkyltin compound RSn(T)$_3$ which represents at least 85 wt % of the tin based stabilizer composition
c) at least a co-stabilizer,
wherein the quantity of the co-stabilizer c) presents at least 0.65 parts per hundred with respect to the halogen containing polymer and wherein the costabilizer mentioned under c) is chosen from an organic polyol with at least three hydroxyl functions, an organic ester with a molecular weight of at least 172 g/mol or an ester of an organic polyol said ester having at least three free hydroxyl functions and mixtures thereof has a good heat stability during processing.

DETAILED DESCRIPTION OF THE INVENTION

According to a first aspect the invention concerns a thermoplastic processable stabilized polymer composition comprising
a) at least one halogen containing polymer
b) a tin based stabilizer composition comprising a monoalkyltin compound RSn(T)$_3$ which represents at least 85 wt % of the tin based stabilizer composition
c) at least a co-stabilizer,
wherein the quantity of the co-stabilizer mentioned under c) presents at least 0.65 parts per hundred with respect to the halogen containing polymer and wherein the co-stabilizer mentioned under c) is chosen from an organic polyol with at least three hydroxyl functions, an organic ester with a molecular weight of at least 172 g/mol or an ester of an organic polyol said ester having at least three free hydroxyl functions and mixtures thereof.

According to another aspect the invention concerns the use of a tin based stabilizer composition comprising a monoalkyltin compound RSn(T)$_3$ which represents at least 85 wt % of the tin based stabilizer composition and a co-stabilizer that is chosen from an organic polyol with at least three hydroxyl functions, an organic with a molecular weight of at least 172 g/mol or an ester of an organic polyol said ester having at least three free hydroxyl functions and mixtures thereof for thermoplastic processing of halogen containing polymers, where the quantity of the co-stabilizer is at least 0.65 parts per hundred with respect to the halogen containing polymer.

By the term "co-stabilizer" as used is denoted an additive that when used alone has no or only minor effect in terms of heat stabilization, but in combination with the alkyl tin compound increases the heat stabilization of the composition of the present invention.

By the term "lubricant" as used is denoted a additive material that is used to improve the flow characteristics of plastics during processing.

By the term "internal lubricant" as used is denoted a compound that is chemically compatible with the polymer and acts by reducing friction between polymer molecules. It reduces Van der Waals forces, leading to a lower melt viscosity and lowering energy input needed for processing.

By the term "external lubricant" as used is denoted a compound that does not interact with the polymer but functions at the surface of the molten polymer between the polymer and the surface of the processing equipment and is generally incompatible with the polymer itself. These lubricants function by coating the process equipment and reducing friction at the point of interface.

By the term "polyol" as used is denoted an organic compound that has at least three hydroxyl groups.

By the term "ester" as used is denoted the class of compounds produced by reaction between acids and alcohols with the elimination of water, comprising the functional group RCOOR.

The abbreviation "phr" as used herein is denoted "parts per hundred" and refers to parts by weight of a respective additive in view of the chlorine containing polymer.

With regard to the halogen containing polymer, mention may be made of:
homopolymers and copolymers of vinyl chloride (PVC) and of vinylidene chloride (PVDC), vinyl resins comprising vinyl chloride units in their structure, such as copolymers of vinyl chloride, and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and its copolymers with vinyl chloride and other polymerizable compounds;

polymers of vinyl chloroacetate and dichlorodivinyl ether; chlorinated polymers of vinyl carboxylate, such as vinyl acetate, vinyl propionate, vinyl butyrate, chlorinated polymeric esters of acrylic acid and of α-substituted acrylic acid, such as methacrylic acid, of nitriles, amides, alkyl esters such as acrylonitrile, (meth)acrylamide, methyl (meth)acrylate, butyl acrylate, ethyl acrylate, 2-ethylhexyl acrylate;

polymers of vinyl aromatic derivatives, such as styrene, dichlorostyrene; chlorinated rubbers;

chlorinated polymers of olefins, such as ethylene, propene, 1-butene, (2.2.1)bicyclo heptene-2, (2.2.1)bicyclo hepta-diene-2,5;

polymers and post-chlorinated polymers of chlorobutadiene and copolymers thereof with vinyl chloride, chlorinated natural and synthetic rubbers, and also mixtures of these polymers with one another or with other polymerizable compounds.

In the context of this invention, PVC also embraces copolymers with polymerizable compounds such as acrylonitrile, vinyl acetate or ABS, which can be suspension, bulk or emulsion polymers. Preference is given to PVC homopolymers and copolymers, optionally post-chlorinated, alone or in combination with polyacrylates.

Also included are graft polymers of PVC with EVA, ABS and MBS. Preferred substrates are also mixtures of the abovementioned homo- and copolymers, especially vinyl chloride homopolymers, with other thermoplastic and/or elastomeric polymers, especially blends with homo- or copolymers as ABS (acrylonitrile-butadiene-styrene), MBS (methylmethacrylate-butadiene-styrene), NBR (nitrile butadiene rubber), SAN (styrene-acrylonitrile), EVA (ethylene-vinyl acetate), CPE (chlorinated polyethylene), MBAS (methylmethacrylate-butadiene-acrylonitrile-styrene), PMA (polyymethyl acrylate), PMMA (polymethylmethacrylate), EPDM (ethylene-propene-diene monomer) and polylactones.

Preferably the halogen of the halogen containing polymer can be chosen from fluorine and chlorine and advantageously the halogen is chlorine. The chlorine containing polymer is chosen from among polymers or mixtures of polymers chosen from among homopolymer vinyl halides such as polyvinyl chloride, polyvinylidene chloride, chlorinated polyvinyl chloride, post-chlorinated polyvinyl chloride and copolymers formed by the polymerisation of a vinyl halide monomer with up to 40% of a comonomer such as vinyl acetate, vinyl butyrate, vinylidene chloride, propylene, methylmethacrylate and the like, as well as chlorine-containing polymers containing other polymers such as chlorinated polyethylene, terpolymers of acrylonitrile, butadiene, styrene, terpolymers of methylmethacrylate, butadiene, styrene; polyacrylate resins, polymethylmethacylate resins and terpolymer of alkyl acrylate, methylmethacrylate, butadiene, preferably the chlorine-containing polymer is polyvinyl chloride or post-chlorinated polyvinyl chloride.

Preferably the chlorine containing polymer is chosen from homo- and copolymers of vinyl chloride (VC); comprising at least 70 wt % of VC units, preferably at least 80 wt % of VC units, advantageously at least 85 wt % of VC units; or mixtures thereof.

Preferably the copolymer of vinyl chloride comprises between 1 wt % and 30 wt % of vinyl acetate units, more preferably between 5 wt % and 20 wt % of vinyl acetate units, advantageously between 10 wt % and 15 wt % of vinyl acetate units.

With regard to the tin based stabilizer composition, the present invention relates to a composition comprising at least 85 wt %, preferably from 85 wt % to 99.99 wt %, more preferably from 90 wt % to 99.99 wt %, still more preferably from 95 wt % to 99.99 wt %, advantageously from 97 wt % to 99.99 wt % (limits included) of at least one monoalkyltin compound of formula $RSn(T)_3$, in which R is linear, branched or cyclic $C_1$-$C_{20}$ alkyl, preferably $C_1$-$C_{10}$ alkyl, and T is a ligand.

More particularly the tin based stabilizer composition of the present inventions comprises from 85 wt % to 99.99 wt %, preferably from 90 wt % to 99.99 wt %, more preferably from 95 wt % to 99.99 wt %, still more preferably from 97 wt % to 99.99 wt % (limits included) of at least one monoalkyltin compound of formula $RSn(T)_3$, in which R is linear, branched or cyclic $C_1$-$C_{20}$ alkyl, preferably $C_1$-$C_{10}$ alkyl, and T is a ligand;

from 0.001 wt % to 10 wt %, preferably from 0.001 wt % to 1 wt %, more preferably from 0.01 wt % to 0.5 wt %, most preferably from 0.01 wt % to 0.1 wt %, of at least one di-alkyltin compound of formula $R_2Sn(T)_2$, in which R and T are as defined above;

from 0.001 wt % to 5 wt %, preferably from 0.005 wt % to 1 wt %, more preferably from 0.01 wt % to 0.5 wt %, most preferably from 0.01 wt % to 0.1 wt %, of at least one tri-alkyltin compound of formula $R_3Sn(T)$, in which R and T are as defined above; and from 0 wt % to 5 wt %, more preferably from 0 wt % to 1 wt %, still more preferably from 0 wt % to 0.2 wt % of one or more impurities.

The tin based stabilizer composition in the thermoplastic processable stabilized polymer composition of the present invention comprises a weight ratio of (mono-alkyltin compound)/(di-alkyltin compound) of not less than 90/10, preferably of not less than 95/5, most preferably of not less than 97/3.

According to still another preferred aspect, the tin based stabilizer composition in the thermoplastic processable stabilized polymer composition of the present invention comprises a weight ratio of (mono-alkyltin compound)/(tri-alkyltin compound) of not less than 99/1, preferably of not less than 99.5/0.5, more preferably of not less than 99.7/0.3.

Still according to another aspect, in tin based stabilizer composition in the thermoplastic processable stabilized polymer composition of the present invention comprises an amount of tri-alkyltin compound(s) of less than 1 wt %, preferably of less than 0.5 wt %, most preferably the composition comprises traces, expressed as parts per million (ppm), and even parts per billion (ppb) of tri-alkyltin compound(s).

Impurities that may be found in tin based stabilizer composition are any and all impurities that may be found as residues (or traces) from the preparation process of the composition, such as ligand precursors, ligand precursor-hydrolysed by-products, tin halides, solvents, alkenes, alkyl halides, catalysts or catalyst components, decomposed catalysts or catalyst components, water, neutralization salts, and the like.

In the tin based stabilizer composition in the thermoplastic processable stabilized polymer composition of the present invention, R is a linear, branched or cyclic alkyl radical having from 1 to 20 ($C_1$-$C_{20}$ alkyl), preferably from 1 to 10 carbon atoms ($C_1$-$C_{10}$ alkyl), and preferably R is methyl, ethyl, propyl, butyl, pentyl, hexyl, heptyl, octyl, nonyl, decyl, cyclopentyl, cyclohexyl, cycloheptyl. The R radical may also comprise one or more unsaturations in the form of double and/or triple bond(s), and in such cases R may be chosen from among propenyl, butenyl, butadienyl, pentenyl, octenyl, octadienyl, cyclohexenyl, phenyl, and the like.

According to a preferred embodiment, R is chosen from among ethyl, n-propyl, iso-propyl, n-butyl, iso-butyl, n-pentyl, n-hexyl, n-heptyl, n-octyl, 2-ethylhexyl, iso-octyl, and decyl. More preferably R is methyl, n-butyl, 2-ethylhexyl, n-octyl, or n-decyl and advantageously from n-octyl.

As regards the ligand T, it is any ligand known in the art, for example as disclosed in EP 0 010 008 or EP 0 501 780. More preferably, T is a ligand the precursor of which being H-T. H-T compounds may advantageously be chosen from among H—$SCH_2CH_2OH$, H—$SCH_2$—CH (OH)—$CH_3$, H—$SCH_2COOR^1$, H—$SCH_2CH_2O$—$COR^2$, H—$SR^2$, H—OH, H—$OOCR^2$, and H—$OOCR^3$—$COOR^2$, wherein $R^1$ represents $C_1$-$C_{12}$ alkyl, $R^2$ represents $C_6$-$C_{18}$ alkyl, aryl or alkylaryl, $R^3$ represents —CH=CH—; or —$CH_2$—$R^4$—$CH_2$—, with $R^4$ representing $C_2$-$C_6$ alkylene.

According to a preferred embodiment, T is chosen from among thioglycolate esters, 2-ethylhexylthioglycolate esters, iso-octylthioglycolates, iso-butylthioglycolates, thioglycolate itself, hydroxyl, carboxylates, maleates, diketonates, alcoholates, more preferably T is 2-ethylhexylmercaptoacetate (EHMA).

In the formula $RSn(T)_3$, each T may be identical or different from the others. According to still a preferred embodiment, all three ligands T are identical.

Preferred compounds of formula $RSn(T)_3$ are RSn[tris(2-ethylhexylmercaptoacetate)], and among them the preferred ones are chosen from among monomethyltin[tris(2-ethylhexylmercaptoacetate)], mono-n-butyltin-[tris(2-ethylhexylmercaptoacetate)], mono-n-octyl[tris(2-ethylhexylmercaptoacetate)], and mixtures thereof. Advantageously, the composition of the present invention comprises mono-n-octyl[tris(2-ethylhexylmercaptoacetate)] as major compound of the tin stabilizer.

The quantity of the tin based stabilizer composition in the thermoplastic processable stabilized polymer composition is at least 1 phr, preferably 1.25 phr, more preferably at least 1.5 phr and advantageously 1.75 phr.

With regard to the co-stabilizer in the thermoplastic processable stabilized polymer composition of the present invention is chosen from polyols, organic esters or organic ester of a polyol, latter said ester of a polyol having at least three free hydroxyl groups and mixtures thereof.

The polyols according to the invention contain three or more OH functional groups. The polyol may be either an n-alcane with at least three hydroxyl (—OH) groups or polyhydric alcohol with three or more methylol (—CH2OH) functional groups.

As polyols may be mentioned trihydroxy ethane, glycerol, threitol, erythritol, pentaerythritol, dipentaerythritol, arabitol, xylitol, ribitol, manitol, sorbitol, ducitiol, iditol, trimethylolethane, trimethylol propane (TMP), ditrimethylol propane (DTMP) and mixtures thereof.

The polyols according to the invention have preferably a molecular weight M of at least 78 g/mol, more preferably a molecular weight M of at least 92 g/mol. The polyols according to the invention have preferably a molecular weight M of less then 4000 g/mol. Advantageously the polyols according to the invention have preferably a molecular weight M at least 92 g/mol and less then 3000 g/mol.

The organic esters according to the invention are the reaction product of organic acids and organic alcohols and particularly esters of monofuntionel or polyfunctionel aliphatic alcohols or aromatic alcohols.

Preferably the organic esters according to the invention are the reaction product of organic acids and monofuntionel or difunctionel aliphatic alcohols.

More preferably the organic esters according to the invention are the reaction product of a mono- or dicarboxylic organic acids and monofuntionel or difunctionel aliphatic alcohols.

The organic esters can be presented by the general formula R1-COO—R2. R1 and R2 can be a linear, branched or cyclic alkyl radical having from 3 to 30 ($C_3$-$C_{30}$ alkyl), preferably from 4 to 25 carbon atoms ($C_4$-$C_{25}$ alkyl), alkenyl radicals, aryl radical or alkylaryl radicals.

In the case of linear alkyls the organic ester has the general formula $CH_3$—$(CH_2)_n$—COO—$(CH_2)_m$—$CH_3$ with 3<n and 3<m, preferably 4<n<30 and 3<m<30, more preferably 5<n<25 and 4<m<25 and advantageously 6<n<22 and 5<m<22, more advantageously 6<n<20 and 5<m<20 and still more advantageously 6<n<19 and 5<m<20.

As organic aliphatic acids for forming the organic ester may be mentioned straight chain alkanoic acids as n-hexanoic acid ($CH_3$—$(CH_2)_4$—COOH), n-heptanic acid, n-octanoic acid, n-nonanoic acid, n-decanoic acid, n-undecanoic acid, n-dodecanoic acid, n-tetradecanoic acid, n-hexadecanoic acid, n-octadecanoic acid, eicosanocic acid and docosanoic acid.

The organic acid for forming the organic ester may also be an unsaturated acid as straight chain alkenoic acids ($CH_3$—$(C_nH_{(2n-2)})$—COOH) with 4<n, as for example 9-decenoic acid, 10-undecenoic acid and cis-9-octadecenoic acid or polyunsaturated acid as for example linoleic acid, linolelidic acid and hiragonic acid.

The organic acid for forming the organic ester may also be an organic acid having another functional group beside it carboxylic acid group.

The acid for forming the organic ester may also be an aliphatic diacids, either unsaturated or saturated. Mention may be made of oxalic acid, malonic acid, succinic acid, glutaric acid, adipic acid, pimelic acid, suberic acid, azelaic acid, sabacic acid, undecanedioic acid, dodecanedioic acid. Also are to be mentioned maleic acid and fumaric acid. It may also be an aromatic diacid as phtalic acid.

As organic alcohols forming the organic ester may be mentioned n-hexanol ($CH_3$—$(CH_2)_5$—OH), 2-methyl-1-pentanol, 2-ethyl-1-butanol, 1-heptanol, n-octanol, 2-octanol, 1-nonanol, 2,6-dimethyl-4-heptanol, n-decanol, n-dodecanol, n-tetradecanol, hexadecanol, n-octadecanol in case of linear aliphatic alcohols. Preferably the alcohol in the organic ester has the general formula ($CH_3$—$(CH_2)_m$—OH), with 3<m<30, more preferably 4<m<25, advantageously 5<m<22 and more advantageously 5<m<20.

Preferably the organic ester has a molecular weight M of at least 172 g/mol. Preferably the organic ester has a molecular weight M of less then 800 g/mol.

The organic ester of a polyol having at least three free hydroxyl functions or groups can be chosen from the polyols mentioned before and the carboxylic acids already mentioned before. Preferred are esters based on polyols of n-alkans.

The three hydroxyl groups of the organic ester of the polyol can be in the organic acid part of the molecule or in the polyol part or in both parts together, as long as the molecule as a whole has three hydroxyl groups.

The carboxylic acid that forms the ester with one of the hydroxyl groups of the polyol, can have a hydroxyl functionality as well. In a preferred embodiment it is a hydroxyl carboxylic acid of an n-alkane.

Advantageously the organic ester of a polyol having at least three free hydroxyl groups has at least one hydroxyl group on the acid part of the organic ester of the polyol. More advantageously the organic ester of a polyol having at least three free hydroxyl groups has at least two hydroxyl group on the acid part of the organic ester of the polyol. Still more advantageously the organic ester of a polyol having at least three free hydroxyl groups has at least three hydroxyl group on the acid part of the organic ester of the polyol.

If the polyol for forming the ester is for example glycerol the carboxylic acid of the monocarboxylate glycerol ester must have a hydroxykl group and the tricarboxylate glycerol ester all three carboxylic acid must have a hydroxykl group.

In a preferred embodiment the hydroxyl carboxylic acids have no unsaturated groups, and consequently the organic ester of the polyol has no unsaturated group as well.

The co-stabilizer in the stabilized polymer composition of the present invention is present at least at 0.65 part per hundred (phr) referring to 100 parts by weight of the halogene containing polymer, preferably at least at 0.75 phr, more preferably at least at 0.8 phr and advantageously at least at 0.9 phr.

The stabilised polymer composition in accordance with the present invention can be brought into the desired form by known methods. Examples of such methods are milling, calendering, extruding, injection moulding or spinning, and also extrusion blow moulding. The stabilised polymers can also be processed to foam materials Stabilised polymer composition in accordance with the invention are suitable, for example, for the manufacture of hollow articles (bottles), packaging films (thermoform sheets), blown films, pipes, foamed materials, heavy profiles (window frames), transparent-wall profiles, construction profiles, sidings, fittings, office films, and apparatus enclosures (computers, domestic appliances). Preference is given to rigid or semi-rigid PVC films (opaque or transparent), PVC rigid foam articles and PVC pipes for drinking water or wastewater, pressure pipes, gas pipes, cable-duct and cable protection pipes, pipes for industrial pipelines, seepage pipes, flow-off pipes, guttering pipes and drainage pipes and more preferably, the article is a rigid or semi-rigid, opaque or transparent film, especially those chosen from among rigid or semi-rigid, opaque or transparent films, shrink-films, adhesive films, sheets, fittings, profiles (window, in-door), edge-bands.

The present invention also relates to articles comprising at least the stabilized polymer composition according to the present invention, and optionally one or more additive(s) as hereinbefore described.

[Methods]

Yellowness index describes the change in color of a test sample from clear or white toward yellow. The Yellowness index Yi is calculated from spectrophotometric data based on ASTM Standard E 313. The b* value in Hunter L*a*b* scale is measured on withdrawn samples with a X-Rite SP60 spectrophotometer.

EXAMPLES

In the following examples, the term <<phr>> means per hundred of PVC resin (ex: 0.2 phr: 0.2 g per 100 g of PVC).

| | |
|---|---|
| PVC (Lacovyl RB8010, Arkema, kW = 57): | 100 |
| Epoxydised soya bean oil (Ecepox PB3, Arkema) | 1 |
| External lubricant (Loxiol G70, Emery Oleo) | 0.6 |
| oxidized PE wax (A-C 316A, Honeywell) | 0.12 |
| Process aid (Plastistrength 551, Arkema) | 0.6 |
| Antisticking process aid (Plastistrength 770, Arkema) | 1 |
| MBS impact modifier (Clearstrength 320, Arkema) | 8 |
| Mono organotin Stabiliser (Thermolite ® 895, Arkema) | 2 |
| Internal lubricant as co-stabilizer (list below) | 1 |

Example 1a) glycerol mono oeleate

Example 1b) glycerol mono ricenoleate

Example 1c) glycerol dioleate

Example 1d) glycerol monostearate

Example 1e) nonyl stearate

Example 1f) stearyl stearate

Example 1g) glycerol trihydroxystearate

Example 1h) distearyl phthalate

Example 1i) glycerol monohydroxystearate

The PVC formulation is evaluated using a Collin two-roll mill, the rolls of which are brought to 195° C. The rotational speeds of the 2 cylinders are respectively adjusted to 20 round/min and 24 rpm, providing sufficient friction to gelate PVC and sufficient heat to well study the thermal stabilization efficiency of stabilizers. The separation between the cylinders is adjusted to 0.5 mm. Samples are withdrawn from the cylinders at regular time intervals of two minutes, their coloration being recorded.

TABLE 1

Yellowness Index Yi as function of milling time

| Time [min] | Ex. 1a Comp | Ex. 1b Comp | Ex. 1c Comp | Ex. 1d Comp | Ex. 1e Inv | Ex. 1f Inv | Ex. 1g Inv | Ex. 1h Inv | Ex. 1i Inv |
|---|---|---|---|---|---|---|---|---|---|
| 2 | 12 | 12 | 13 | 11 | 12 | 12 | 13 | 11 | 13 |
| 4 | 14 | 14 | 14 | 13 | 12 | 13 | 13 | 12 | 13 |
| 6 | 14 | 15 | 16 | 14 | 14 | 14 | 16 | 13 | 14 |
| 8 | 17 | 17 | 16 | 16 | 16 | 16 | 17 | 16 | 16 |
| 10 | 22 | 23 | 20 | 21 | 18 | 19 | 19 | 17 | 20 |
| 12 | 27 | 29 | 25 | 27 | 21 | 22 | 22 | 22 | 24 |
| 14 | 35 | 37 | 33 | 32 | 26 | 26 | 24 | 25 | 29 |
| 16 | 48 | 47 | 43 | 42 | 31 | 29 | 29 | 29 | 36 |
| 18 | 70 | 69 | 63 | 53 | 35 | 34 | 35 | 34 | 45 |
| 20 | 93 | 92 | 86 | 69 | 39 | 40 | 42 | 42 | 62 |
| 22 | 110 | 115 | 107 | 83 | 46 | 47 | 51 | 49 | 86 |
| 24 | nm* | nm* | nm* | nm* | 59 | 58 | 67 | 65 | 110 |
| 26 | nm* | nm* | nm* | nm* | 77 | 70 | 89 | 86 | nm* |
| 28 | nm* | nm* | nm* | nm* | 97 | 90 | 110 | 100 | nm* |

*nm = not measured

Each example contains example formulations that are either comparative ones (Comp) or formulations according to the invention (Inv).

Thermolite® 895: Mono organotin >99.7% mono octyl tin (2 ethyl hexyl mercapto acetate)=MOTE (CAS n° 27107-89-7)

Thermolite® 890=30% mono octyl tin (2 ethyl hexyl mercapto acetate) (CAS n° 27107-89-7) and 70% di octyl tin (2 ethyl hexyl mercapto acetate) (CAS n° 15571-58-1) which is considered as a "standard" organotin stabilizer.

Example 1—Example Formulations 1a-1g

Synergy of MOTE at 2 phr and specific internal lubricants as co-stabilizers

The components of the PVC formulation and their amounts in phr are the following:

The results listed in Table 1 show the synergy between some specific internal lubricants as co-stabilizers and Themolite® 895. While the comparative formulations 1a to 1d have no or very few impact on dynamic thermal stability in view of the yellowness index, the combination Thermolite® 895 and specific internal lubricants as co-stabilizers in formulations 1e to 1i allows an improvement the colorhold retention.

Example 2—Example Formulations 2a-2d

Synergy of MOTE at 1.5 phr and specific internal lubricants as co-stabilizers

The components of the PVC formulation and their amounts in phr are the following:

| PVC (Lacovyl RB8010, Arkema, kW = 57): | 100 |
|---|---|
| Epoxydised soya bean oil (Ecepox PB3, Arkema) | 1 |
| External lubricant (Loxiol G70, Emery Oleo) | 0.6 |
| oxidized PE wax (A-C 316A, Honeywell) | 0.12 |
| Process aid (Plastistrength 551, Arkema) | 0.6 |
| Antisticking process aid (Plastistrength 770, Arkema) | 1 |
| MBS impact modifier (Clearstrength 320, Arkema) | 8 |
| Mono organotin Stabiliser (Thermolite ® 895, Arkema) | 1.5 |
| Internal lubricant as co-stabilizer (list below) | 1 |

Example 2a) glycerol monoeleate

Example 2b) nonyl stearate

Example 2c) stearyl stearate

Example 2d) glycerol trihydroxystearate

The PVC formulations are evaluated and the samples are withdrawn by the same means as in example 1.

TABLE 2

Yellowness Index Yi as function of milling time for formulations of example 2.

| Time [min] | Ex. 2a Comp | Ex. 2b Inv | Ex. 2c Inv | Ex. 2d Inv |
|---|---|---|---|---|
| 2 | 12 | 12 | 13 | 11 |
| 4 | 14 | 14 | 15 | 13 |
| 6 | 15 | 16 | 16 | 15 |
| 8 | 18 | 19 | 20 | 17 |
| 10 | 25 | 22 | 23 | 21 |
| 12 | 37 | 27 | 28 | 26 |
| 14 | 52 | 36 | 37 | 34 |
| 16 | 75 | 45 | 48 | 43 |
| 18 | 96 | 58 | 66 | 57 |
| 20 | 115 | 75 | 90 | 77 |
| 22 |  | 95 | 100 | 96 |

The results listed in Table 2 show example that the synergy effect between some specific internal lubricant as co-stabilizer and mono octyltin stabilizer is maintained even at lower dosage of mono octyltin stabilizer.

Example 3

Comparative formulations 3a to 3d using internal lubricants and "standard" octylorganotin stabilizers The components of the PVC formulation and their amounts in phr are the following:

| PVC (Lacovyl RB8010, Arkema, kW = 57): | 100 |
|---|---|
| Epoxydised soya bean oil (Ecepox PB3, Arkema) | 1 |
| External lubricant (Loxiol G70, Emery Oleo) | 0.6 |
| oxidized PE wax (A-C 316A, Honeywell) | 0.12 |
| Process aid (Plastistrength 551, Arkema) | 0.6 |
| Antisticking process aid (Plastistrength 770, Arkema) | 1 |
| MBS impact modifier (Clearstrength 320, Arkema) | 8 |
| Mono/Diorgantin Stabiliser Thermolite ® 890, Arkema) | 2 |
| Internal lubricant as co-stabilizer (list below) | 1 |

Internal lubricants are chosen in the list below

Example 3a) glycerol monoeleate

Example 3b) glycerol trihydroxystearate

Example 3c) stearyl stearate

Example 3d) di stearyl phthalate

The PVC formulations are evaluated and the samples are withdrawn by the same means as in example 1.

TABLE 3

Yellow Index Yi as function of milling time for formulations of example 3.

| Time [min] | Ex. 3a Comp | Ex. 3b Comp | Ex. 3c Comp | Ex. 3d Comp |
|---|---|---|---|---|
| 2 | 11 | 13 | 11 | 11 |
| 4 | 13 | 15 | 14 | 14 |
| 6 | 15 | 19 | 17 | 17 |
| 8 | 17 | 22 | 19 | 19 |
| 10 | 19 | 25 | 23 | 22 |
| 12 | 22 | 27 | 26 | 26 |
| 14 | 28 | 33 | 30 | 31 |
| 16 | 35 | 39 | 38 | 36 |
| 18 | 40 | 44 | 43 | 44 |
| 20 | 49 | 53 | 50 | 51 |
| 22 | 59 | 61 | 60 | 58 |
| 24 | 72 | 69 | 68 | 67 |
| 26 | 88 | 84 | 79 | 80 |
| 28 | 107 | 103 | 95 | 96 |

The internal lubricants as co-stabilizers that have a good synergy with Thermolite® 895 (see as described in example 1) do not bring an improvement on color hold retention in terms of yellowness index, when used in combination with high dialkyl tin content stabilizer such as Thermolite® 890.

Example 4—Example Formulations 4a-4i

Synergy of MOTE at 2 phr and polyols

The components of the PVC formulation and their amounts in phr are the following:

| PVC (Lacovyl RB8010, Arkema, kW = 57): | 100 |
|---|---|
| Epoxydised soya bean oil (Ecepox PB3, Arkema) | 1 |
| Internal lubricant (Loxiol G10, Emery Oleo) | 1 |
| External lubricant (Loxiol G70, Emery Oleo) | 0.6 |
| oxidized PE wax (A-C 316A, Honeywell) | 0.12 |
| Process aid (Plastistrength 551, Arkema) | 0.6 |
| Antisticking process aid (Plastistrength 770, Arkema) | 1 |
| MBS impact modifier (Clearstrength 320, Arkema) | 8 |
| Mono organotin Stabiliser (Thermolite ® 895, Arkema) | 2 |
| polyol (list below) | 0.5 or1 |

Example 4a) with out polyol

Example 4b) 0.5 phr polyvinyl alcohol (PVA—Mowiol 4-88 Clariant)

Example 4c) 1 phr polyvinyl alcohol (PVA—Mowiol 4-88 Clariant)

Example 4d) 0.5 phr polyethylene mono alcohol (Unilin 425 Baker Petrolite)

Example 4e) 1 phr polyethylene mono alcohol (Unilin 425 Baker Petrolite)

Example 4f) 0.5 phr Trimethylolpropane

Example 4g) 1 phr Trimethylolpropane

Example 4h) 0.5 phr Di (Trimethylolpropane)

Example 4i) 1 phr Di (Trimethylolpropane)

TABLE 4

Yellowness Index Yi as function of milling time

| Time [min] | Ex. 4a Comp | Ex. 4b Comp | Ex. 4c Comp | Ex. 4d Comp | Ex. 4e Comp | Ex. 4f Inv | Ex. 4g Inv | Ex. 4h Inv | Ex. 4i Inv |
|---|---|---|---|---|---|---|---|---|---|
| 2  | 12  | 12  | 13  | 12  | 12 | 12 | 12 | 12  | 12 |
| 4  | 13  | 13  | 14  | 13  | 13 | 13 | 13 | 13  | 14 |
| 6  | 15  | 15  | 15  | 15  | 15 | 15 | 15 | 14  | 15 |
| 8  | 16  | 16  | 17  | 17  | 17 | 16 | 16 | 17  | 16 |
| 10 | 22  | 20  | 21  | 20  | 19 | 18 | 18 | 19  | 20 |
| 12 | 28  | 25  | 27  | 26  | 24 | 21 | 20 | 23  | 22 |
| 14 | 37  | 31  | 38  | 30  | 31 | 26 | 24 | 29  | 25 |
| 16 | 51  | 44  | 52  | 46  | 41 | 32 | 28 | 39  | 32 |
| 18 | 72  | 61  | 71  | 62  | 58 | 42 | 36 | 47  | 36 |
| 20 | 95  | 82  | 93  | 84  | 79 | 52 | 47 | 58  | 46 |
| 22 | 111 | 100 | 106 | 104 | 96 | 65 | 58 | 67  | 59 |
| 24 | nm* | nm* |     |     |    | 80 | 72 | 85  | 77 |
| 26 |     |     |     |     |    | 94 | 87 | 101 | 92 |

*nm = not measured

The results listed in Table 4 show the synergy between MOTE and some specific polyols from example formulations 4f to 4g.

Example 5

Comparative formulations 5a to 5c using polyols and "standard" octylorganotin stabilizers The components of the PVC formulation and their amounts in phr are the following:

| | |
|---|---|
| PVC (Lacovyl RB8010, Arkema, kW = 57): | 100 |
| Epoxydised soya bean oil (Ecepox PB3, Arkema) | 1 |
| Internal lubricant (Loxiol G10, Emery Oleo) | 1 |
| External lubricant (Loxiol G70, Emery Oleo) | 0.6 |
| oxidized PE wax (A-C 316A, Honeywell) | 0.12 |
| Process aid (Plastistrength 551, Arkema) | 0.6 |
| Antisticking process aid (Plastistrength 770, Arkema) | 1 |
| MBS impact modifier (Clearstrength 320, Arkema) | 8 |
| Mono/Diorgantin Stabiliser Thermolite ® 890, Arkema) | 2 |
| polyol (list below) | 1 |

Example 5a) without polyol
Example 5b) 1 phr Trimethylolpropane
Example 5c) 1 phr Di (Trimethylolpropane)

TABLE 5

Yellowness Index Yi as function of milling time

| Time [min] | Ex. 5a Comp | Ex. 5b Comp | Ex. 5c Comp |
|---|---|---|---|
| 2  | 12 | 13 | 12 |
| 4  | 13 | 14 | 14 |
| 6  | 15 | 16 | 17 |
| 8  | 16 | 17 | 18 |
| 10 | 18 | 19 | 20 |
| 12 | 20 | 21 | 23 |
| 14 | 15 | 24 | 26 |
| 16 | 30 | 27 | 31 |
| 18 | 27 | 31 | 37 |
| 20 | 45 | 38 | 46 |
| 22 | 52 | 45 | 55 |
| 24 | 63 | 51 | 55 |
| 26 | 75 | 57 | 78 |
| 28 | 90 | 69 | 92 |

The results listed in Table 5 show that there is no significant or no specific synergy between the standard octylorganotin stabilizers (mixture of mono and decompounds) and the specific polyols as there was in example 4 from example formulations 4f to 4g.

The invention claimed is:

1. A thermoplastic processable stabilized polymer composition comprising
    a) at least one chlorine containing polymer;
    b) a tin based stabilizer composition comprising a mono alkyl tin compound of formula $RSn(T)_3$ which represents at least 85 wt % of the tin based stabilizer composition in which T is a ligand, and R is a linear, branched or cyclic $C_1$-$C_{20}$ alkyl; and,
    c) at least one co-stabilizer,
        wherein a quantity of the co-stabilizer mentioned under c) presents at least 0.65 phr with respect to the chlorine containing polymer and wherein the co-stabilizer c) is an ester of an organic polyol said ester having at least three free hydroxyl groups.

2. The thermoplastic processable stabilized polymer composition according to claim 1, wherein the tin based stabilizer composition comprises from 85 wt % to 99.99 wt % (limits included) of at least one monoalkyltin compound of formula $RSn(T)_3$, in which R is linear, branched or cyclic $C_1$-$C_{20}$ alkyl, and T is a ligand.

3. The thermoplastic processable stabilized polymer composition according to claim 1, wherein the tin based stabilizer composition comprises
    from 85 wt % to 99.99 wt % (limits included) of at least one monoalkyltin compound of formula $RSn(T)_3$, in which R is linear, branched or cyclic $C_1$-$C_{20}$ alkyl, and T is a ligand,
    from 0.001 wt % to 10 wt % of at least one di-alkyltin compound of formula $R_2Sn(T)_2$, in which R and T are as defined above,
    from 0.001 wt % to 5 wt of at least one tri-alkyltin compound of formula $R_3Sn(T)$, in which R and T are as defined above, and
    from 0 wt % to 5 wt % of one or more impurities.

4. The thermoplastic processable polymer composition according to claim 3, wherein the chlorine containing polymer is chosen from the group consisting of polymers or mixtures of polymers chosen from the group consisting of homopolymer vinyl halides including polyvinyl chloride, polyvinylidene chloride, chlorinated polyvinyl chloride, and post-chlorinated polyvinyl chloride; copolymers formed by a polymerization of a vinyl halide monomer with up to 40% of a comonomer from the group consisting of vinyl acetate, vinyl butyrate, vinylidene chloride, propylene, methylmethacrylate as well as chlorine-containing polymers containing other polymers, including chlorinated polyethylene; polyvinyl chloride; post-chlorinated polyvinyl chloride; terpolymers of acrylonitrile, butadiene, and styrene; terpolymers of methylmethacrylate, butadiene, and styrene; polyacrylate resins; polymethylmethacylate resins; and terpolymers of alkyl acrylate, methylmethacrylate, and butadiene.

5. The thermoplastic processable polymer composition according to claim 4, wherein the chlorine containing polymer is chosen from the group consisting of polyvinyl chloride (PVC) homopolymer or copolymer or mixtures thereof.

6. The thermoplastic processable polymer composition according to claim 1, wherein R of the monoalkyl tin compound b) is chosen from the group consisting of methyl, ethyl, n-propyl, iso-propyl, n-butyl, iso-butyl, n-pentyl, n-hexyl, n-heptyl, n-octyl, 2-ethylhexyl, iso-octyl, and decyl.

7. The thermoplastic processable polymer composition according to claim 1, wherein T is chosen from the group consisting of thioglycolate esters, 2-ethylhexylthioglycolate esters, iso-octylthioglycolates, iso-butylthioglycolates, thioglycolate itself, hydroxyl, carboxylates, maleates, diketonates and alcoholates.

8. The thermoplastic processable polymer composition according to claim 1, wherein co-stabilizer is present at least at 0.75 phr.

9. The thermoplastic processable polymer composition according to claim 1, wherein the polyol has a molecular weight M of at least 78 g/mol.

10. The thermoplastic processable polymer composition according to claim 1, wherein the polyol has a molecular weight M of less than 4000 g/mol.

11. The thermoplastic processable polymer composition according to claim 1, wherein the organic ester is presented by a general formula R1-COO—R2 and R1 and R2 can be a linear, branched or cyclic alkyl radical having from 3 to 30 carbon atoms ($C_3$-$C_{30}$ alkyl), alkenyl radicals, aryl radical or alkylaryl radicals.

12. The thermoplastic processable polymer composition according to claim 1, wherein the organic ester is a reaction product of an organic acid and monofunctional or difunctional aliphatic alcohols.

13. The thermoplastic processable polymer composition according to claim 1, wherein the co-stabilizer is an organic ester of a polyol, said ester having at least three free hydroxyl groups and at least one hydroxyl group is on an acid part of the organic ester of the polyol.

14. The thermoplastic processable polymer composition according to claim 13, wherein the ester of the polyol has no unsaturations.

15. A method of using a tin based stabilizer composition for thermoplastic processing of halogen containing polymers, wherein a quantity of the stabilizer is at least 0.65 parts per hundred with respect to the halogen containing polymer, and wherein the tin based stabilizer comprises a monoalkyltin compound $RSn(T)_3$ in which T is a ligand, and R is a linear, branched or cyclic $C_1$-$C_{20}$ alkyl, which represents at least 85 wt % of the tin based stabilizer composition and a co-stabilizer that is an ester of an organic polyol said ester having at least three free hydroxyl groups.

16. An article comprising the thermoplastic processable polymer composition according to claim 1, wherein the article is selected from the group consisting of a hollow article, a packaging film, a blown film, a pipe, a foamed material, a heavy profile, a transparent-wall profile, a construction profile, a siding, a fitting, an office film, an apparatus enclosure, a rigid or semi-rigid opaque or transparent polyvinyl chloride (PVC) film, a PVC rigid foamed article, a PVC pipe for drinking water or wastewater, a pressure pipe, a gas pipe, a cable-duct and a cable protection pipe, a pipe for industrial pipelines, a seepage pipe, a flow off pipe, a guttering pipe, and a drainage pipe.

17. The thermoplastic processable polymer composition according to claim 1, wherein the chlorine containing polymer is chosen from the group consisting of polymers or mixtures of polymers chosen from the group consisting of homopolymer vinyl halides including polyvinyl chloride, polyvinylidene chloride, chlorinated polyvinyl chloride, and post-chlorinated polyvinyl chloride; copolymers formed by the polymerization of a vinyl halide monomer with up to 40% of a comonomer from the group consisting of vinyl acetate, vinyl butyrate, vinylidene chloride, propylene, methylmethacrylate, as well as chlorine-containing polymers containing other polymers including polyvinyl chloride; post-chlorinated polyvinyl chloride; chlorinated polyethylene; terpolymers of acrylonitrile, butadiene, and styrene; terpolymers of methylmethacrylate, butadiene, and styrene; polyacrylate resins; polymethylmethacylate resins; and terpolymers of alkyl acrylate, methylmethacrylate, and butadiene.

18. The thermoplastic processable polymer composition according to claim 1, wherein the chlorine containing polymer is chosen from the group consisting of polyvinyl chloride homopolymer and copolymer or mixtures thereof.

19. A thermoplastic processable stabilized polymer composition comprising:
  a) at least one chlorine containing polymer;
  b) a tin based stabilizer composition comprising a mono alkyl tin compound of formula $RSn(T)_3$ which represents at least 85 wt % of the tin based stabilizer composition in which T is a ligand, and R is a linear, branched or cyclic $C_1$-$C_{20}$ alkyl; and,
  c) at least a co-stabilizer,
    wherein a quantity of the co-stabilizer mentioned under c) presents at least 0.65 phr with respect to the chlorine containing polymer and wherein the co-stabilizer c) is chosen from the group consisting of mixtures of at least two of the following: an organic polyol with at least three hydroxyl groups, an organic ester with a molecular weight of at least 172 g/mol, and/or an ester of an organic polyol said ester having at least three free hydroxyl groups.

20. The method of claim 15 wherein the co-stabilizer is chosen from the group consisting of mixtures of at least two of the following: an organic polyol with at least three hydroxyl groups, an organic ester with a molecular weight of at least 172 g/mol, and/or an ester of an organic polyol said ester having at least three free hydroxyl groups.

* * * * *